Figure 1:
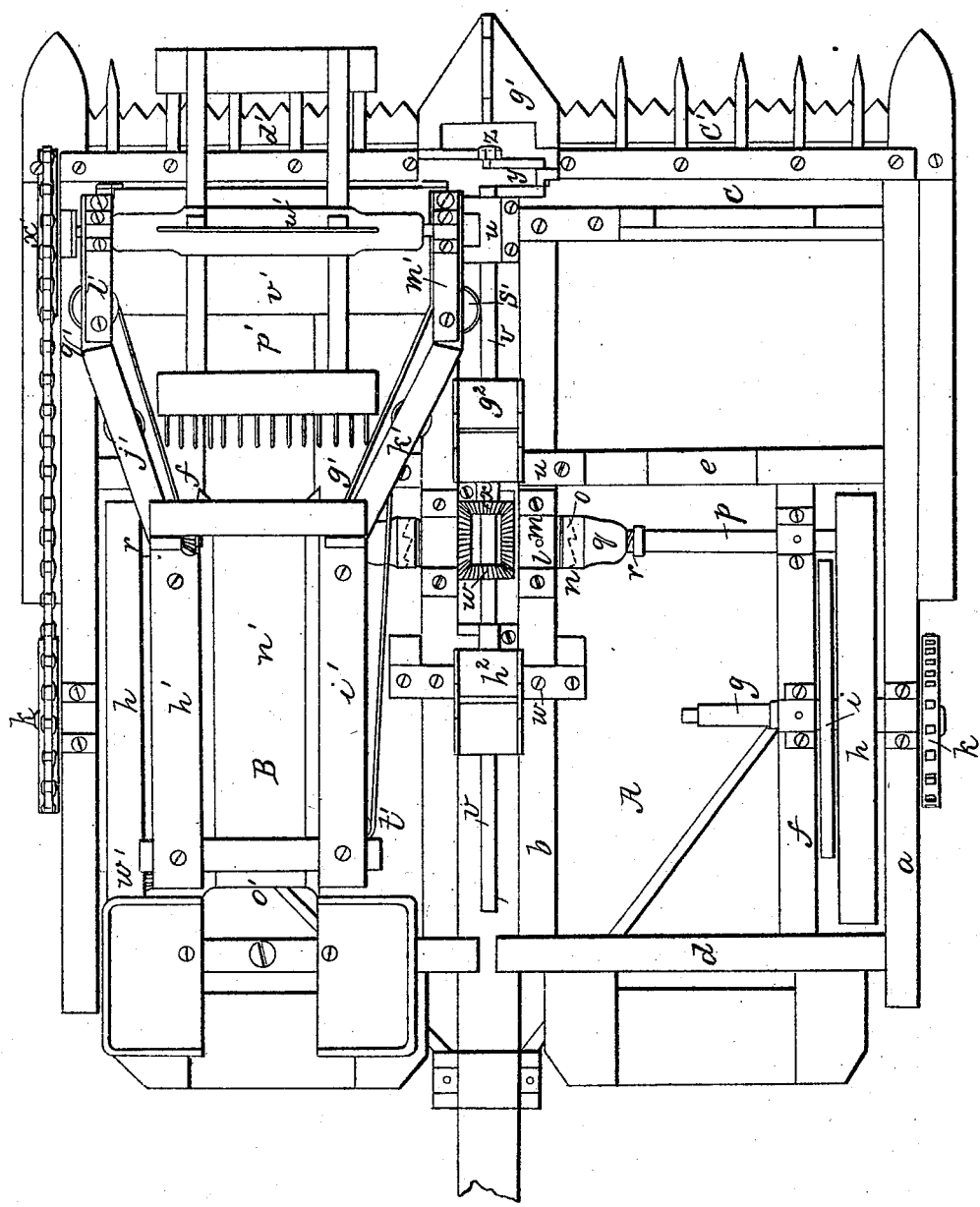

3 Sheets—Sheet 1.

A. ELLIOTT.

Harvester.

No. 14,556.

Patented April 1, 1856.

A. ELLIOTT.
Harvester.
3 Sheets—Sheet 2.
No. 14,556.
Patented April 1, 1856.
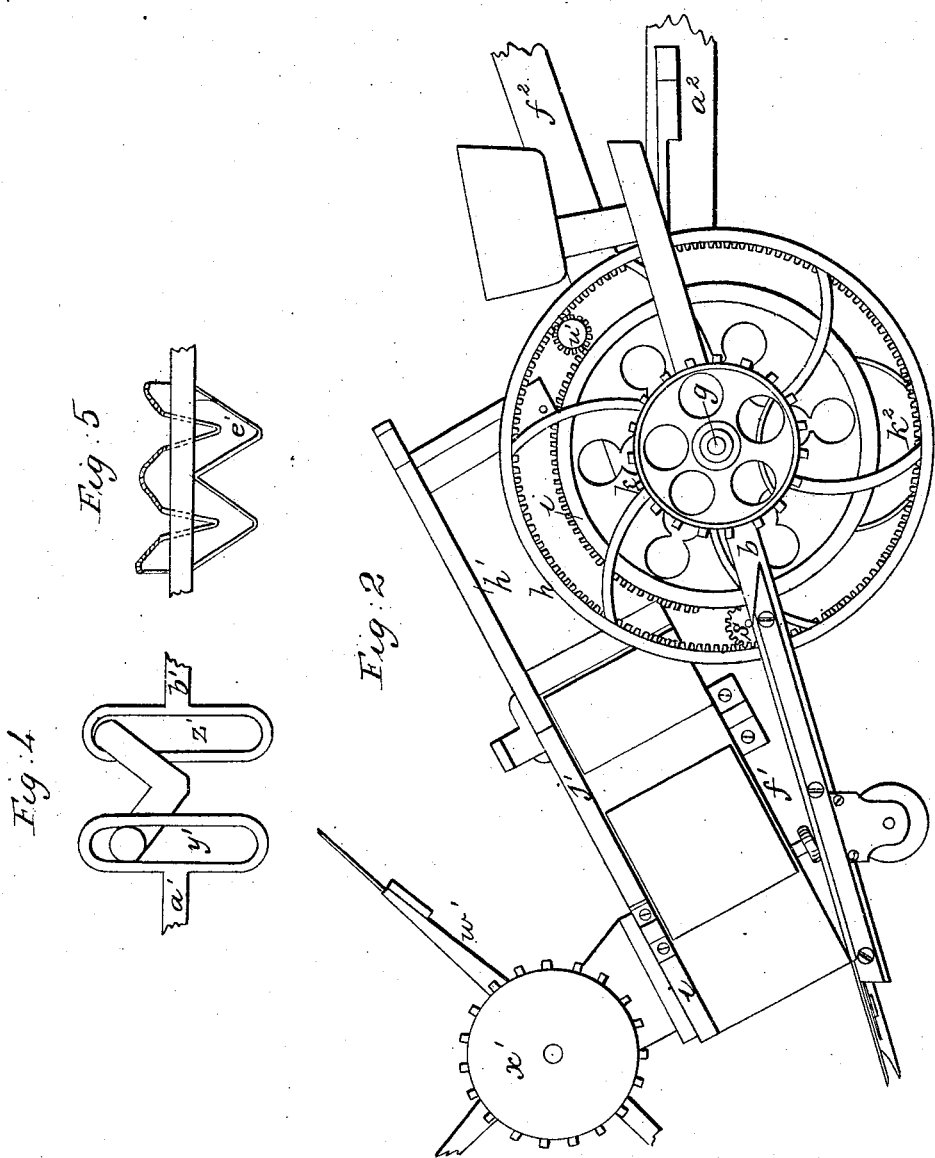

A. ELLIOTT.
Harvester.
No. 14,556.
3 Sheets—Sheet 3.
Patented April 1, 1856.
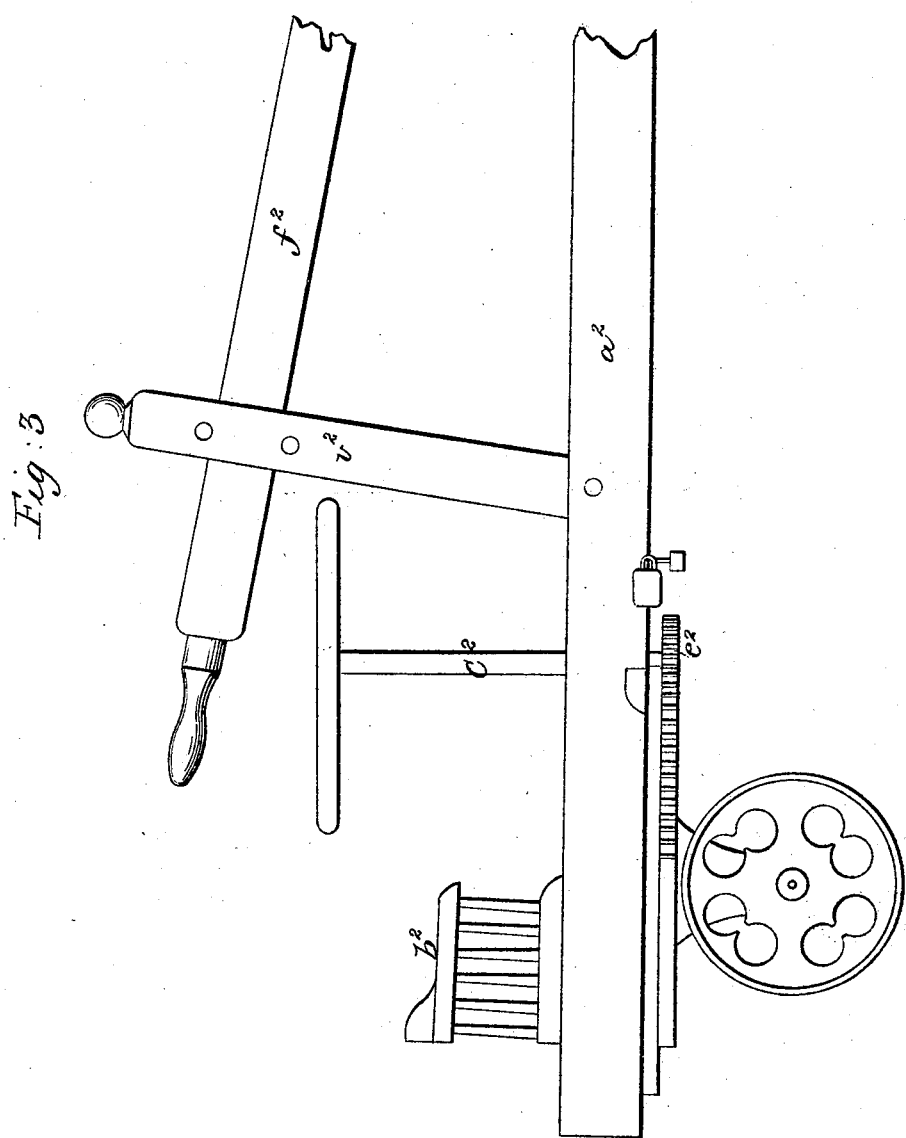

UNITED STATES PATENT OFFICE.

AUGUSTUS ELLIOTT, OF SAN FRANCISCO, CALIFORNIA.

IMPROVEMENT IN GRAIN-HARVESTERS.

Specification forming part of Letters Patent No. 14,556, dated April 1, 1856.

*To all whom it may concern:*

Be it known that I, AUGUSTUS ELLIOTT, of the city and county of San Francisco, and State of California, have invented certain new and useful Improvements in Bundling-Harvesters; and I hereby declare that the following is a full, clear, and exact description thereof, reference being had to the accompanying drawings, making a part of this specification, in which—

Figure 1 is a top view with the raking and bundling apparatus removed from one section. Fig. 2 is a side view with the pole and elevating-lever broken off. Fig. 3 is a side view of the steering apparatus and a portion of the pole by which the machine is pushed forward. Fig. 4 is an enlarged front view of the double crank and slotted pieces which transmit motion to the cutter bars, and Fig. 5 is a bottom view of a portion of one of the cutting-knives.

The machine is constructed in two compartments, A and B, hinged together in the direction of its advancing motion, for the purpose of enabling it to accommodate itself to the transverse inequalities of the land, whether arising from natural causes or in consequence of the land having been plowed in ridges. As the compartments A and B are made exactly alike with the exception that all the parts which are placed to the right in one are on the left in the other, the description of one will suffice.

I make a wooden frame, consisting of two longitudinal pieces, $a$ and $b$, united at their ends by two cross-pieces, $c$ and $d$, and having between them another cross-piece, $e$, which carries one end of a longitudinal piece, $f$, extending to the rear cross-piece, $d$. The shaft $g$ has its bearings upon $a$ and $f$. A large annular or internal geared driving-wheel, $h$, and a wheel, $i$, toothed upon one-third of its periphery, are keyed thereon between the bearings. On the same shaft, but outside of the frame, is keyed a toothed pulley, $k$. A bearing, $l$, on the cross-piece $b$ carries a short hollow shaft, $o$, which revolves therein, with a bevel-gear, $m$, fixed to its outer extremity and half of a clutch, $n$, to its inner one. A shaft, $p$, has one of its bearings in the hollow shaft $o$ and the other upon the piece $f$. It carries thereon half of a clutch, $q$, which slides upon a feather on the shaft, and is kept up to the other half, $n$, by a spring, $r$. Each part of the clutch has ratchet-teeth, which take into one another, communicating motion from the shaft $p$ only when the driving-wheel moves in a forward direction. The shaft $p$ has keyed upon its other extremity a small spur-wheel, $s$, which takes into the teeth of the annular driving-wheel $h$. The pivots of the hinges $u$, which unite the two parts of the machine, are made large and hollow, and afford bearings for the longitudinal shaft $v$, which carries keyed thereon a bevel-gear, $w$, which takes into the bevel-gear $m$ on A, and another, $x$, which takes into the corresponding one on B. The forward end of the shaft $v$ has two cranks, $y$ and $z$, the pins of which work in vertical slots $y'$ and $z'$ attached transversely to arms $a'$ and $b'$, which, being connected respectively with the cutter-bars $c'$ and $d'$, communicate thereto a reciprocating horizontal motion in such a manner as when one crank is passing its dead-center the knife which it propels is at rest, while the other is doing its greatest work, thus equalizing the strain upon the shaft $v$. A divider, $g'$, hinged in the center in a line with the shaft $v$, serves to divide the grass and grain and throw it clear of the cranks. The knives are formed by the cutting-teeth $e'$, riveted to the upper side of the bars $c'$ and $d'$. They present acute angles in front with the points taken off, and project far enough in rear of the bar to form other cutting-points, more obtuse in their form and serrated or sickle-edged with the points taken off. The lines of the edges of these teeth are not continued until they meet the bar, but turn at an angle of about fifty degrees, and cross the bar until they meet the corresponding lines of the adjoining teeth, thus forming a very acute-angled opening, which extends to the rear. The cutter-teeth are beveled upon their lower edges. The cutter-bars can be readily detached from the arms $a'$ and $b'$ and attached by their other extremities, thus bringing the serrated points of the knives to the front, or vice versa, as the machine may be required to cut grass or grain.

The bundling apparatus is shown on compartment B. It is so constructed as to be readily removed when the machine is to be used for cutting grass. It is composed of two bed-pieces, $f'$ and $g'$, united by cross-pieces, and having upright supporting top pieces, $h'$ $i'$ $j'$ $k'$ $l'$ $m'$, with two cross-pieces, thus forming a frame open in front, about the width of the compartment upon which it is placed, the sides converging in about half of their length to about one-third of the width of the front; thence continuing of the same width to the rear. A hanging frame, $n'$, is composed of two side pieces, with revolving rollers at each end, around which pass an endless band. Prolongations of the journals of the upper roller form pivots by which the frame $n'$ is suspended. A roller at $o'$ and another at $p'$ carry an endless band, which forms the bottom or floor of the bundling apparatus. A vertical roller at $q'$ and another at $r'$ carry an endless band, and a vertical roller, $s'$, and another, at $t'$, carry another endless band, guided by other rollers. All these bands receive their motion at proper intervals from the wheel $t$ and the spur-wheel $u'$, taking therein, which latter, being fixed to the roller $O'$, which is connected with all the other rollers by means of the bands and suitable miter-gearing, causes the inside surfaces of all the bands to move toward the rear at a uniform speed. An apron, $v'$, is placed across the throat of the bundling apparatus and hinged at its forward edge. It is supported in a position inclined to the front by springs of any convenient form.

A reel or gatherer, $w'$, of the usual form, rests upon bearings elevated above the top pieces $m'$ and $l'$. From the cross-piece which connects one pair of the arms of the reel a set of long rake-teeth project radially. Upon the outer end of the reel-shaft is keyed a toothed pulley, $x'$, which is connected with the pulley $k$ by a chain-band. The reel and whole bundling apparatus are readily removed when required. Two seats are placed near the outlet of the bundling apparatus, where two boys receive the compressed bundles and bind them.

The machine is propelled by horses attached on each side of the pole $a^2$, and is steered by the driver (seated at $b^2$) by means of a vertical shaft, $c^2$, which, passing through the pole, carries keyed to its lower extremity a spur-wheel, $e^2$, which is attached to a swivel-carriage with two wheels.

A lever, $f^2$, is hinged at $g^2$, and has its fulcrum at $n^2$. Its other end, passing through a slotted standard, $i^2$, is within the reach of the driver, who can thus lift the forward end to any desired elevation and secure it there by means of a pin through the standard. The lever is not required for use when cutting grass, as the machine is then supported by its guide-rollers.

The machine is supported in the center by a swivel-wheel, $k^2$.

The operation is as follows: The machine being put in motion in a straight line, in the manner before described, with the points of the knife intended for grain in front, the annular driving-wheels both aid in working the cutter-knives by means of the shafts and gearing before described. The grain is gathered by the reel, cut, and lodged on the spring-platforms; but when it deviates from the straight line, as in turning corners, the outside wheel, or the one that describes the largest curve, alone works the knives, the form and position of the ratchet-teeth in the clutches allowing either wheel to stop or diminish its speed without interfering with the action of the other. The teeth upon the gatherer are so placed with reference to the bundling apparatus as to pass over the spring-platform and rake the grain therefrom onto the lower band at the same moment that the teeth upon the wheel $i$ engage with the spur-wheel $u'$, which gives motion to the rollers and endless bands during about one-third of a revolution, which is sufficient to convey the grain (which has been accumulating on the platform during a whole revolution) through the compressing apparatus and project the bundle about one-half of its length out of the end of the apparatus, where it stops during the remaining two-thirds of the revolution, giving time to the boys to bind it.

Having thus fully described my improvements, what I claim as my invention, and desire to secure by Letters Patent, is—

1. Forming the cut grain into sheaves or bundles by means of a series of endless bands and rollers having an intermittent motion, substantially as described.

2. The spring-apron $v'$, constructed substantially as described and for the purposes specified.

In testimony whereof I have hereunto signed my name this 22d day of December, 1854.

AUGUSTUS ELLIOTT.

Witnesses:
T. C. DONN,
CHAS. EVERETT.